United States Patent [19]

Füglistaller et al.

[11] Patent Number: 4,850,194

[45] Date of Patent: Jul. 25, 1989

[54] BURNER SYSTEM

[75] Inventors: Cornel Füglistaller, Jonen; Jakob Keller, Dottikon; Thomas Sattelmayer, Mandach, all of Switzerland

[73] Assignee: BBC Brown Boveri AG, Baden, Switzerland

[21] Appl. No.: 129,172

[22] Filed: Dec. 7, 1987

[30] Foreign Application Priority Data

Dec. 11, 1986 [CH] Switzerland .......................... 4928/86

[51] Int. Cl.$^4$ ............................................. F23R 3/28
[52] U.S. Cl. ...................................... 60/737; 60/742; 60/748
[58] Field of Search ................... 60/737, 742, 748, 738

[56] References Cited

U.S. PATENT DOCUMENTS

| | | | |
|---|---|---|---|
| 3,630,024 | 12/1971 | Hopkins | 60/742 |
| 3,764,071 | 10/1973 | Carlisle | 60/742 |
| 3,777,983 | 12/1973 | Hibbins | 60/742 |
| 3,788,067 | 1/1974 | Carlisle et al. | 60/742 |
| 3,866,413 | 2/1975 | Sturgess | 60/742 |
| 3,937,011 | 2/1976 | Caruel et al. | 60/742 |
| 4,260,367 | 4/1981 | Markowski et al. | 60/742 |
| 4,373,325 | 2/1983 | Shekleton | 60/737 |
| 4,726,192 | 2/1988 | Willis et al. | 60/737 |

FOREIGN PATENT DOCUMENTS

| | | |
|---|---|---|
| 0095788 | 12/1983 | European Pat. Off. . |
| 0108361 | 5/1984 | European Pat. Off. . |
| 0193838 | 9/1986 | European Pat. Off. . |
| 3606625 | 9/1986 | Fed. Rep. of Germany . |
| 1031184 | 6/1966 | United Kingdom . |

Primary Examiner—Donald E. Stout
Attorney, Agent, or Firm—Burns, Doane, Swecker & Mathis

[57] ABSTRACT

The present invention relates to a burner system, in particular for a gas turbine, with a main supply channel (2), debouching into a combustion chamber (1), for a fuel/air mixture having a swirler (5) and a burner lance (3) which passes through the swirler (5). To improve the transverse ignition properties between several such burner systems, optionally disposed on the burner chamber (1), and also to increase the flame stability, the burner lance (3) has, on the combustion chamber side with respect to the swirler (5) exit openings (12, 16) for fuel supplied to its interior or for a fuel-rich fuel/air mixture supplied to, or formed in, its interior.

6 Claims, 2 Drawing Sheets

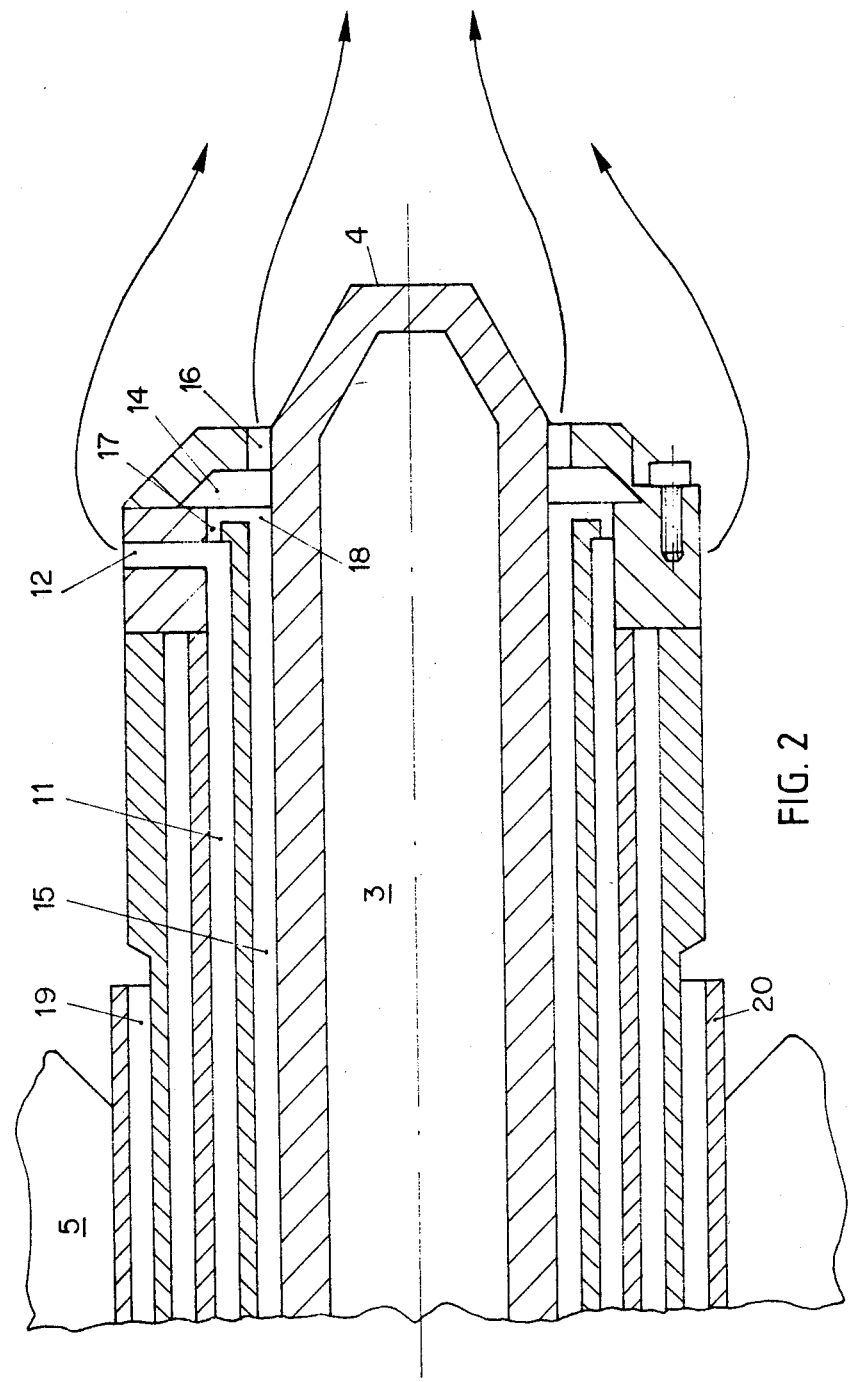

BURNER SYSTEM

TECHNICAL FIELD

The present invention relates to a burner system which is primarily provided for a gas turbine. It relates in particular to a burner system with a main supply channel, debouching into a combustion chamber, for a fuel/air mixture having a swirler and a burner lance which passes through the swirler.

RELATED ART

Nowadays diffusion burners are virtually exclusively used in gas turbines. In the course of the efforts to reduce pollutant emissions, the use of premix burners has already been considered. In contrast to diffusion burners, in the case of premix burners a combustion mixture with a uniform air/fuel ratio is presented to the flame in the combustion chamber. The air/fuel ratio $\lambda$ is proportional to the quotient of the quantity of combustion air and the quantity of fuel in the combustion mixture. It is standardized in a manner such that $\lambda = 1$ is equivalent to a stoichiometric mixture. The temperature of the flame, on which the pollutant formation is substantially dependent, can be controlled by the adjustment of the air/fuel ratio. With premix burners it is possible to achieve, in particular, low nitrogen oxide values.

A problem in relation to premix burners is, however, their low regulability. With an air/fuel ratio of $>$ about 2.4 for the combustion mixture, the flame goes out. The range of regulation of premix burners is too small for use in gas turbines. It must be possible to run gas turbines for electricity generation from full load down to idling. Designs for solving the regulation problem often provide combustion chambers with a multiplicity of premix burners which can be switched on or off stepwise. Within the scope of these designs, premix burners which can be used must, on the one hand, guarantee an adequate flame stability and, on the other hand, ensure that, in any operating mode, the flame is immediately ignited by the adjacent burner.

SUMMARY OF THE INVENTION

An object of the present invention is to provide a burner system of the type mentioned in the introduction which, in contrast to known burner systems, has such a high flame stability that the total regulating range in gas turbines can be run through without switching off burners and which, in addition, has a good transverse ignition capability.

The objects mentioned and also further objects are, according to the present invention, achieved by providing a burner system with the features of claim 1. According to the invention, therefore, in a burner arrangement of the type mentioned in the introduction, the burner lance has, on the combustion chamber side with respect to the swirler, exit openings for fuel supplied to its interior or for a fuel-rich fuel/air mixture supplied to, or formed in, its interior.

In addition to the good transverse ignition properties achieved with the invention, the flame is additionally stabilized by the invention. As a consequence of this stabilization effect, the stable operating range of the burner system can be extended to hitherto unachievable operating ranges with a large excess of air in the combustion mixture.

Advantageous developments of the invention are characterized in the subclaims.

BRIEF DESCRIPTION OF THE DRAWING

Further features and advantages of the present invention emerge from the detailed description below, taking account in particular, of the accompanying drawings.

In these:

FIG. 2 is a detail of FIG. 1 with the head of the burner lance in an enlarged representation compared with FIG. 1.

PREFERRED EMBODIMENTS OF THE INVENTION

Figure 1:
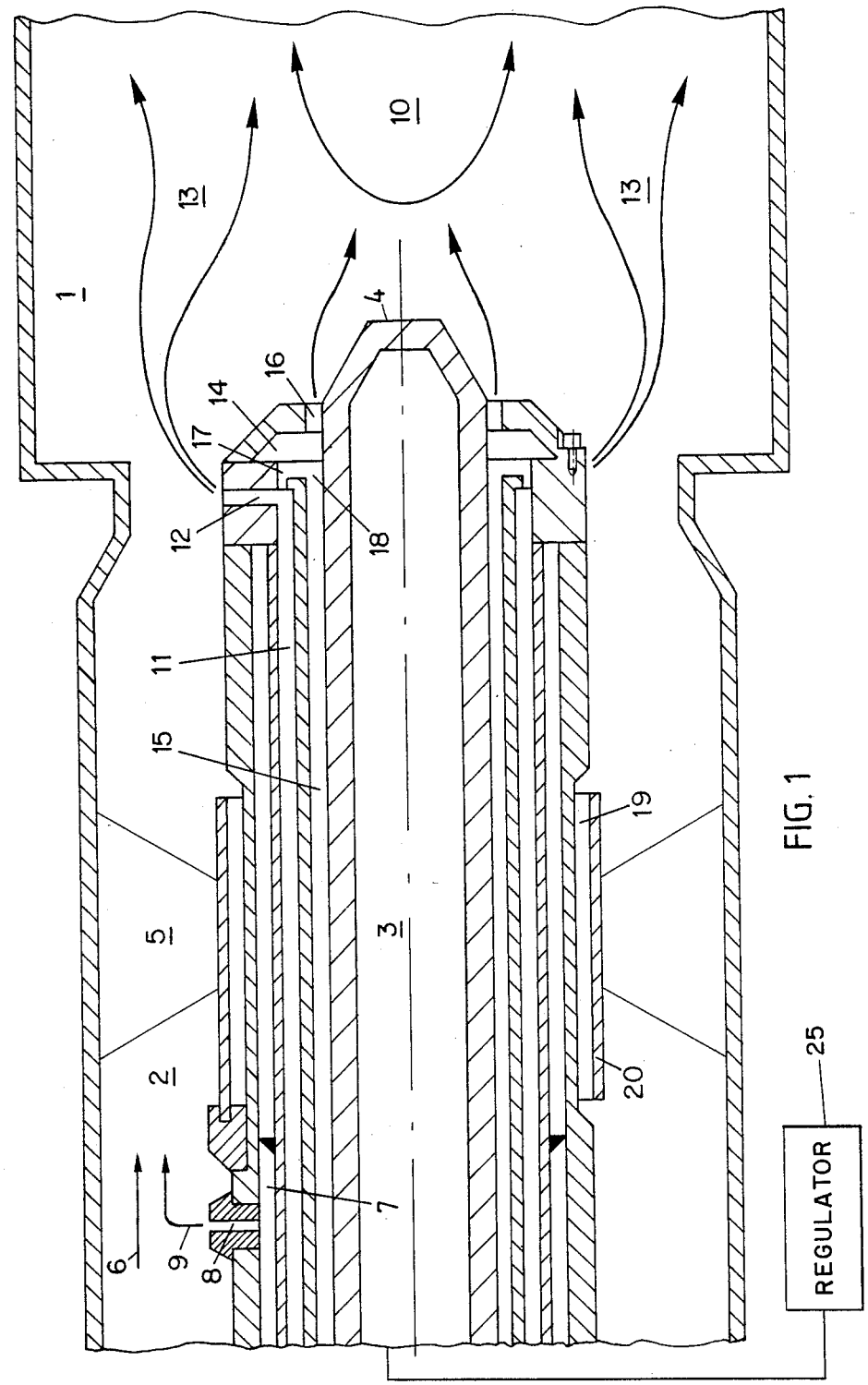
FIG. 1 is a cross-sectional representation of a burner system with a burner lance constructed according to the invention.

From now on reference is made to the drawings. In FIG. 1, 1 reference numeral denotes a combustion chamber, shown in part, into which a main supply channel, 2, likewise shown only in part, for a fuel/air mixture debouches.

In the main supply channel, there is disposed a burner lance 3 whose head 4 is located in the vicinity of the entrance to the combustion chamber 1. The burner lance 3 is also not shown in its full length. The burner lance 3 passes through, in the flow direction, a swirler 5 likewise disposed in the main supply channel upstream of its head or head section 4.

The fuel/air mixture is formed in the main supply channel 2 in the flow direction upstream of the swirler 5. The combustion air enters the space upstream of the swirler 5 from the left-hand edge of FIG. 1 (arrow 6). The fuel is supplied via a supply channel 7 in the burner lance 3 and injected via jets 8 into the space where it mixes with the combustion air (arrow 9). Apart from its special construction explained below, the burner system shown is thus far a premix burner. Due to the geometry of the burner system, a dynamically stabilized vortex backflow zone 10 (vortex breakdown) freely develops in the combustion space 1 during the operation of the burner system.

As already explained, a premix burner can only be regulated in very narrow limits. In order to extend the regulation range of the burner system and, in particular in order to prevent a complete extinction of the flame in the combustion space 1 when the burner system is idling, the burner lance 3 is constructed as follows: on the combustion chamber side with respect to the swirler 5 it is provided with exit openings (additional openings in relation to the jets 8) for fuel supplied to its interior or for a fuel-rich fuel/air mixture supplied to, or formed in, its interior. "Fuel-rich" in this case relates to the combustion mixture which is formed in each as in the main supply channel 2 in the space upstream of the swirler 5.

As a result of the construction of the burner lance 3 according to the invention, a back-up burner or a holding burner is embodied in its head 4. The back-up burner is preferably constructed as a diffusion burner and the holding burner as a premix burner. Preferably, a combination of both designs which advantageously supplement each other in relation to their action in a manner explained further below, are used.

The burner lance 3 shown in the Figures is constructed so that both a back-up burner and also a holding burner are produced.

To construct the back-up burner, a fuel channel 11 (an additional channel in relation to the supply channel 7) which has exit openings 12 leading outwards at the head 4 of the burner lance 3 is provided in the burner lance 3.

The holding burner includes a premix chamber 14 into which a channel for combustion air 15 and also the fuel channel 11 debouche. The holding burner has auxiliary openings 16 aligned axially with respect to the combustion chamber 1, and which are provided in the head 4 of the burner lance. The premix chamber 14 is constructed as an annular chamber. The exit openings 16 may be distributed uniformly around its circumference or comprise an annular slit.

The exit openings 12 of the fuel channel 11 are dimensioned relatively to its debouchment opening 17 into the premix chamber 14 so that between 85% and 95% of the fuel supplied through the fuel channel 11 emerges through it and, correspondingly, only between 5% and 15% enters the premix chamber 14.

Relative to the debouchment opening 17 of the fuel channel in the premix chamber 14, the cross-section or the debouchement opening 18 of the combustion air channel 15 into the premix chamber 14 can be adjusted or dimensioned so that, in the range that is important for the stabilization of the back-up burner, a fuel/air mixture with an air/fuel ratio of between 0.3 and 1.0 is produced in the premix chamber. Relatively to the air/fuel ratio of the fuel/air mixture which is established on the basis of the diffusion burner section of the burner system, the air/fuel ratio of the mixture which forms in the premix chamber should be a factor of 5–15 larger.

The exit openings 16 of the premix chamber 14 are dimensioned in a manner such that the velocity of the mixture flow emerging from them is greater than 25% of the velocity of the flow entering the combustion chamber from the main supply channel 2.

As a result of the choice of a high fuel fraction in the fuel/air mixture emerging from the axial exit openings 16 of the premix chamber 14, and also of its comparatively high velocity, the mixture is not combustible in the immediately vicinity of the head 4 of the burner lance 3. It is only able to ignite when it impinges upon the vortex breakdown zone 10 which retards it. As a result, the flame supported by the holding burner only develops at a safe distance from the head of the burner lance, which also reliably prevents the flame from backfiring, in particular, into the premix chamber 14.

A backfire of the flame supported by the back-up burner into the main supply channel 2 can be prevented by leaving a narrow gap 19, between the swirler 5 and the burner lance 3 through which gap a largely swirl-free flow layer is formed on the surface of the burner lance 3 from the swirler 5 to the combustion chamber 1. To construct the gap 19, the swirler 5 is provided with a cylindrical guide plate 20 which has a greater dimension in the flow direction than the swirler 5. In the gap region, the cross-section of the burner lance 3 is preferably some-what reduced.

The burner lance 3 shown in the Figures is essentially formed from tubes inserted inside each other between which the channels mentioned for the combustion air and the fuel are produced.

Instead of forming the fuel/air mixture for the holding burner in a premix chamber in the head 4 of the burner lance 3, it could, of course, also be formed outside the burner lance 3.

The supply for the fuel and the combustion air for the back-up burner and the holding burner is preferably regulatable by a regulator 25, shown schematically in FIG. 1. As a result of this, there is the possibility of throttling said burners during normal operation of the burner system (partial load) or shutting them off (full load) and putting them into operation only if the air/fuel ratio of the fuel/air mixture formed in the main supply channel 2 is increased.

This switching-on preferably occurs if the air/fuel ratio of the fuel/air mixture formed in the main supply channel 2 reaches a value which indicates the critical limit for a pure premix combustion.

The fuel/air mixture entering the combustion chamber 1 from the main supply channel 2 is enriched by the fuel emerging from the exit openings 12 of the back-up burner. As a result of this, a combustible mixture and, consequently, a flame continues to be maintained in the zones denoted 13 in the combustion chamber 1 over a wide air/fuel ratio range of the fuel/air mixture formed in the main supply channel 2.

This flame supported by the back-up burner is then supported in turn and stabilized by the flame of the holding burner. It therefore still continues to be maintained in an advantageous manner even if its extinction limit is per se exceeded. This will be the case, as a rule, during idling of the burner system.

The choice of the mass flows of the air for the holding burner and the mass flow from the main supply channel 2 through the swirler 5 may be such that their ratio is less than 1:80. The additional pollution emission caused by the holding burner is negligibly small.

We claim:

1. A burner system for a gas turbine, comprising:
   a combustion chamber;
   a main supply channel debouching into the combustion chamber;
   a swirler arranged in the main supply channel;
   a burner lance extending through the swirler;
   a fuel channel provided in the interior of the burner lance, said fuel channel having first exit openings leading radially outwardly into the combustion chamber;
   a premix chamber provided in the interior of the burner lance;
   a combustion air channel provided in the interior of the burner lance;
   said fuel channel and said combustion air channel debouching into the premix chamber via debouchement openings;
   second exit openings from the premix chamber leading axially outwardly into the combustion chamber;
   said premix chamber being an annular chamber, wherein the second exit openings are distributed about the circumference of the premix chamber; and
   said first exit openings being dimensioned in relation to the debouchement openings extending into the premix chamber such that a majority of the fuel supplied to the combustion chamber emerges through the first exit openings.

2. The burner system as claimed in claim 1, wherein the first exit openings are so dimensioned in relation to the debouchement openings into the premix chamber that between 85% and 95% of the fuel supplied emerges through the first exit openings.

3. The burner system as claimed in claim 1, wherein the debouchement openings of the fuel channel and the combustion air channel into the premix chamber are so dimensioned that a fuel/air mixture with an air/fuel ratio between 0.3 and 1.0 is established in the premix chamber.

4. The burner arrangement as claimed in claim 1, wherein the second exit openings of the premix chamber are so dimensioned that the velocity of the mixture flow emerging from them is greater than 25% of the velocity of the flow entering the combustion chamber from the main supply channel.

5. The burner system as claimed in claim 1, further comprising a cylindrical guide plate which simultaneously forms the inner termination of the swirler, wherein a gap is formed between the burner lance and the guide plate, and wherein the cross-section of the burner lance is reduced in the region of the gap.

6. The burner system as claimed in claim 1, wherein a supply of fuel or of a fuel/air mixture via the exit openings of the burner lance is regulable, and in particular can be shut off.

* * * * *